US009958272B2

(12) United States Patent
Morris, IV et al.

(10) Patent No.: US 9,958,272 B2
(45) Date of Patent: May 1, 2018

(54) REAL-TIME COMPUTATION OF VEHICLE SERVICE ROUTES

(71) Applicant: TELOGIS, INC., Aliso Viejo, CA (US)

(72) Inventors: Arthur Newth Morris, IV, Laguna Beach, CA (US); Ralph James Mason, Christchurch (NZ)

(73) Assignee: Telogis, Inc., Aliso Viejo, CA (US)

( * ) Notice: Subject to any disclaimer, the term of this patent is extended or adjusted under 35 U.S.C. 154(b) by 0 days. days.

(21) Appl. No.: 13/800,719

(22) Filed: Mar. 13, 2013

(65) Prior Publication Data

US 2014/0046585 A1 Feb. 13, 2014

Related U.S. Application Data

(60) Provisional application No. 61/682,150, filed on Aug. 10, 2012.

(51) Int. Cl.
*G01C 21/00* (2006.01)
*G01C 21/34* (2006.01)
*G06Q 10/04* (2012.01)
*G08G 1/00* (2006.01)

(52) U.S. Cl.
CPC .......... *G01C 21/00* (2013.01); *G01C 21/343* (2013.01); *G01C 21/3415* (2013.01); *G06Q 10/047* (2013.01); *G08G 1/205* (2013.01)

(58) Field of Classification Search
None
See application file for complete search history.

(56) References Cited

U.S. PATENT DOCUMENTS

| 4,926,336 A | 5/1990 | Yamada |
| 5,486,822 A | 1/1996 | Tenmoku et al. |
| 5,610,821 A | 3/1997 | Gazis et al. |
| 5,657,231 A | 8/1997 | Nobe et al. |
| 5,880,958 A | 3/1999 | Helms |
| 5,938,720 A * | 8/1999 | Tamai ........................... 701/533 |
| 6,026,346 A | 2/2000 | Ohashi et al. |
| 6,154,658 A | 11/2000 | Caci |

(Continued)

FOREIGN PATENT DOCUMENTS

| JP | 2012 141755 A | 7/2012 |
| KR | 10-0763125 B1 | 1/2002 |

(Continued)

OTHER PUBLICATIONS

Garmin, ecoRoute™ Owner's Manual Supplement, Jan. 2009, pp. 1-5.

(Continued)

*Primary Examiner* — Rami Khatib
*Assistant Examiner* — Nicholas K Wiltey

(57) ABSTRACT

A route scheduling system for a vehicle or fleet of vehicles can recalculate a scheduled route based on input received after the formulation and/or dispatch of the initial route. The additional inputs can be used for recalculation and changes in route selection, which may include a variety of inputs, such as weather conditions, traffic conditions, customer needs, vehicle inventory, and emergency situations. The recalculation of the routes can allow for route selection to be performed in real-time in order for fleets and vehicles to optimize the allocation of resources.

19 Claims, 6 Drawing Sheets

(56) References Cited

U.S. PATENT DOCUMENTS

| | | | |
|---|---|---|---|
| 6,295,503 B1 | 9/2001 | Inoue et al. | |
| 6,317,686 B1 | 11/2001 | Ran | |
| 6,321,161 B1 | 11/2001 | Herbst et al. | |
| 7,062,380 B2 | 6/2006 | Oonishi et al. | |
| 7,356,405 B1 | 4/2008 | Nesbit | |
| 7,433,889 B1 | 10/2008 | Barton | |
| 7,565,155 B2 | 7/2009 | Sheha et al. | |
| 7,706,964 B2 | 4/2010 | Horvitz et al. | |
| 7,778,773 B2 | 8/2010 | Yaqub et al. | |
| 7,865,298 B2 | 1/2011 | Macneille et al. | |
| 8,040,256 B2 | 10/2011 | Rani et al. | |
| 8,214,142 B2 | 7/2012 | Cerecke et al. | |
| 8,285,696 B2 | 10/2012 | Droznin et al. | |
| 8,290,701 B2 | 10/2012 | Mason et al. | |
| 8,423,283 B2 | 4/2013 | Cerecke et al. | |
| 8,428,307 B2 | 4/2013 | Bradai et al. | |
| 8,509,987 B2 | 8/2013 | Resner | |
| 8,552,847 B1 | 10/2013 | Hill | |
| 8,630,768 B2 | 1/2014 | McClellan | |
| 8,706,409 B2 | 4/2014 | Mason et al. | |
| 8,745,516 B2 | 6/2014 | Mason et al. | |
| 8,886,453 B2 | 11/2014 | Cerecke et al. | |
| 9,008,888 B1* | 4/2015 | Gravino et al. | 701/26 |
| 9,129,460 B2 | 9/2015 | McClellan | |
| 9,135,759 B2 | 9/2015 | Baer et al. | |
| 9,157,756 B2 | 10/2015 | Mason et al. | |
| 2001/0014849 A1* | 8/2001 | King et al. | 701/210 |
| 2002/0016576 A1 | 2/2002 | Lee | |
| 2002/0128773 A1 | 9/2002 | Chowanic et al. | |
| 2003/0031167 A1 | 2/2003 | Singh et al. | |
| 2003/0197612 A1 | 10/2003 | Tanaka et al. | |
| 2003/0223408 A1 | 12/2003 | Chen et al. | |
| 2004/0039520 A1 | 2/2004 | Khavakh et al. | |
| 2004/0088392 A1 | 5/2004 | Barrett et al. | |
| 2004/0104842 A1 | 6/2004 | Drury et al. | |
| 2005/0043884 A1 | 2/2005 | Atarashi | |
| 2005/0107951 A1 | 5/2005 | Brulle-Drews et al. | |
| 2005/0171692 A1 | 8/2005 | Hamblen et al. | |
| 2006/0097855 A1 | 5/2006 | Turnbull et al. | |
| 2006/0100777 A1 | 5/2006 | Staton et al. | |
| 2006/0241854 A1 | 10/2006 | Tu et al. | |
| 2007/0027593 A1 | 2/2007 | Shah | |
| 2007/0027612 A1 | 2/2007 | Barfoot et al. | |
| 2007/0106465 A1 | 5/2007 | Adam et al. | |
| 2007/0156326 A1 | 7/2007 | Nesbitt | |
| 2007/0162372 A1 | 7/2007 | Anas | |
| 2007/0173993 A1 | 7/2007 | Nielsen et al. | |
| 2007/0208492 A1 | 9/2007 | Downs et al. | |
| 2007/0263590 A1 | 11/2007 | Abileah et al. | |
| 2007/0276582 A1 | 11/2007 | Coughlin | |
| 2008/0125958 A1 | 5/2008 | Boss et al. | |
| 2008/0183376 A1 | 7/2008 | Knockeart et al. | |
| 2008/0235688 A1 | 9/2008 | Panttaja et al. | |
| 2008/0249667 A1* | 10/2008 | Horvitz et al. | 701/1 |
| 2008/0294339 A1 | 11/2008 | Tauchi et al. | |
| 2009/0048774 A1* | 2/2009 | Yoshioka et al. | 701/202 |
| 2009/0063045 A1 | 3/2009 | Figueroa et al. | |
| 2009/0079555 A1 | 3/2009 | Aguirre De Carcer et al. | |
| 2009/0228317 A1 | 9/2009 | Pfeifle et al. | |
| 2009/0234521 A1 | 9/2009 | Kumar et al. | |
| 2009/0248587 A1 | 10/2009 | Van Buskirk | |
| 2009/0248605 A1 | 10/2009 | Mitchell et al. | |
| 2009/0254272 A1* | 10/2009 | Hendrey | 701/210 |
| 2010/0017110 A1 | 1/2010 | Sengoku et al. | |
| 2010/0036599 A1 | 2/2010 | Froeberg et al. | |
| 2010/0036606 A1* | 2/2010 | Jones | 701/202 |
| 2010/0057340 A1* | 3/2010 | Kravets | G01C 21/3484 701/416 |
| 2010/0088163 A1 | 4/2010 | Davidson et al. | |
| 2010/0121565 A1* | 5/2010 | Uyeki et al. | 701/201 |
| 2010/0145609 A1 | 6/2010 | Boss et al. | |
| 2010/0153005 A1 | 6/2010 | Cerecke et al. | |
| 2010/0188288 A1 | 7/2010 | Bahlmann et al. | |
| 2010/0312466 A1 | 12/2010 | Katzer et al. | |
| 2011/0029238 A1* | 2/2011 | Lee | G01C 21/3407 701/414 |
| 2011/0041088 A1 | 2/2011 | Mason et al. | |
| 2011/0098915 A1* | 4/2011 | Disatnik | G01C 21/3415 701/533 |
| 2011/0112747 A1* | 5/2011 | Downs et al. | 701/118 |
| 2011/0184642 A1 | 7/2011 | Rotz et al. | |
| 2011/0224898 A1* | 9/2011 | Scofield et al. | 701/200 |
| 2011/0225068 A1* | 9/2011 | Figueroa et al. | 705/27.1 |
| 2011/0238457 A1* | 9/2011 | Mason et al. | 705/7.14 |
| 2011/0264366 A1 | 10/2011 | Cabral | |
| 2012/0123632 A1 | 5/2012 | Nejah | |
| 2012/0197504 A1* | 8/2012 | Sujan et al. | 701/70 |
| 2012/0226390 A1 | 9/2012 | Adams et al. | |
| 2012/0307064 A1 | 12/2012 | Schenken | |
| 2013/0211660 A1 | 8/2013 | Mitchell | |
| 2014/0074391 A1* | 3/2014 | Tate, Jr. | 701/400 |
| 2014/0195310 A1 | 7/2014 | McQuade | |
| 2015/0197247 A1 | 7/2015 | Ichinokawa | |
| 2015/0285651 A1 | 10/2015 | Cerecke et al. | |

FOREIGN PATENT DOCUMENTS

| | | |
|---|---|---|
| KR | 2002 0002954 A | 1/2002 |
| KR | 10 2012 0078130 A | 7/2012 |

OTHER PUBLICATIONS

International Search Report and Written Opinion dated Feb. 14, 2011 for PCT Application No. PCT/US10/58113.

International Search Report dated Nov. 21, 2013, International Application No. PCT/US2013/054009.

Australian Office Action First Patent Examination Report, dated Oct. 25, 2014, for corresponding application No. 2010324651, in 3 pages.

Chinese Notice of the First Office Action for Corresponding App No. 201080062233.4, dated Nov. 4, 2014, in 25 pages.

International Search Report and the Written Opinion of the International Searching Authority from International Application No. PCT/US2009/067164 dated Feb. 15, 2010.

International Search Report and Written Opinion, International Application No. PCT/US2011/56778, dated Mar. 28, 2012.

International Preliminary Report on Patentability issued in International Application No. PCT/US09/67164 dated May 25, 2012.

* cited by examiner

REAL-TIME COMPUTATION OF VEHICLE SERVICE ROUTES

CROSS-REFERENCE TO RELATED APPLICATIONS

This application claims priority to U.S. Application No. 61/682,150, filed Aug. 10, 2012, titled REAL-TIME COMPUTATION OF VEHICLE SERVICE ROUTES, the entire contents of which are incorporated by reference herein and made a part of this specification.

BACKGROUND

Route selection or optimization has applications in vehicle routing, printed wire circuit layout, chip design and layout, and biological activities. Trucking and other vehicle fleets, for instance, select vehicle routes to deliver goods to various destinations. Similarly, transportation companies route vehicles to pick up and drop off passengers. In addition to land-based vehicles, route selection can also be used for ship, airplane, and rail transport route scheduling.

A typical route selection problem is to reduce or minimize the distance traveled or time spent traveling. Route selection problems might consider such factors as a number of turns in a given route, a number of intersections, speed limits, bridge crossings, and the like. Algorithms modeled using concepts from graph theory are often used to select routes.

SUMMARY

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

In accordance with one embodiment, a method for dynamically updating a vehicle route includes calculating a first route having a first route cost based at least partly on a first set of data. The method can also include providing an electronic representation of the first route for presentation to a driver of a vehicle. The method can also include receiving a second set of data subsequent to the vehicle traversing a portion of the first route. The second set of data can be different from the first set of data. The method can also include updating the first route cost of the first route to produce an updated route cost based on the second set of data. The method can also include comparing the updated route cost to a route cost threshold to determine whether to recalculate a new route in place of at least a portion of the first route. The method can also include calculating a second route in response to the updated route cost meeting the route cost threshold, wherein the second route has a second route cost. The method can also include determining whether a difference between the updated route cost and the second route cost meets a route cost change threshold to determine whether to replace at least a portion of the first route with the second route. And in response to determining that the difference between the updated route cost and the second route cost meets the route cost change threshold, replacing at least a portion of the first route with the second route and outputting an electronic representation of the second route for presentation to the driver. Calculating the second route can be implemented by a computer system having computer hardware.

In some embodiments the method can include requesting administrator approval for replacing at least a portion of the first route with the second route in response to the route cost change threshold being met. The second set of data can have one or more of the following: a change in traffic data, a change in customer order data, a change in weather data, and a change in fuel cost data. The second route cost can be determined based on one or more of the following: a time component, a monetary component, a distance component, and an energy usage component. The first route can be configured for the vehicle and the second route can be configured for a second vehicle. The method can also include transmitting the second route to the second vehicle in response to determining that the vehicle can no longer service the first route.

In another embodiment of a system for dynamically updating vehicle routes, the system includes a data repository configured to store data used to calculate vehicle routes and a vehicle management system (VMS). The vehicle management system has computer hardware, the vehicle management system configured to at least calculate an initial vehicle route having a plurality of route characteristics based on the data stored in the data repository. The VMS can also provide data representing the initial vehicle route to a navigation device associated with a vehicle or a driver. In response to receiving new data affecting the initial vehicle route, the VMS can also update the initial vehicle route to account for the new data received after formulation of the initial vehicle route. The VMS can also calculate at least one alternative vehicle route based at least in part on the new data. The VMS can also determine whether a difference between the updated initial vehicle route and the at least one alternative vehicle route meets a route change threshold. The VMS can also replace at least a portion of the initial vehicle route with the at least one alternative vehicle route to form at least one new vehicle route. The VMS can also output the at least one new vehicle route to the navigation device.

In some embodiments the VMS can be further configured to request approval for the at least one new vehicle route prior to outputting the at least one new vehicle route to the navigation device. The VMS can be further configured to calculate the initial vehicle route for a first vehicle and to calculate the at least one alternative vehicle route for a second vehicle, wherein the first vehicle and the second vehicle are different vehicles. The navigation device can be an in-vehicle device having Global Positioning System (GPS) functionality. The update of the initial vehicle route can adjust travel time of at least a portion of the initial vehicle route.

In yet another embodiment, non-transitory physical computer storage comprising instructions stored thereon that, when executed in one or more processors, cause the one or more processors to implement operations for dynamically updating vehicle routes. The operations can include calculating an initial vehicle route having a first cost. The operations can also include providing data representing the initial vehicle route to a navigation device associated with a vehicle. The operations can also include receiving information that impacts the initial route subsequent to the vehicle traveling a portion of the initial route. The operations can also include in response to receiving the information that impacts the initial route, calculating an alternative vehicle route having a second cost, said calculating being based on the information that impacts the initial route. The operations can also include determining whether a difference the first cost of the initial vehicle route and the second cost of the alternative vehicle route meets a route change threshold. The operations can also include in response to determining that the difference between the first and second costs meets the route change threshold, transmitting data representing the alternative vehicle route to the navigation device.

In some embodiments the first cost can represent a first travel time of the initial vehicle route and the second cost can represent a second travel time of the alternative vehicle route. The operations can also include replacing the initial vehicle route with the alternative vehicle route. The operations can also include requesting approval for the alternative route prior to transmitting data representing the alternative vehicle route to the navigation device. The operations can also include calculating the initial vehicle route for a first vehicle and calculating the alternative route for a second vehicle, wherein the first vehicle and the second vehicle are different vehicles. The information that impacts the initial vehicle route can include information related to one or more of the following: weather conditions, traffic conditions, customer needs, vehicle inventory, and an emergency situation.

In yet another embodiment of a method for dynamically updating vehicle routes, the method includes receiving information related to an initial route of a vehicle subsequent to the vehicle traveling a portion of the initial route. The method can also include in response to receiving the information related to the initial route, adjusting the initial route to produce an adjusted route based at least in part on the information that impacts the initial route. The method can also include determining, with one or more processors, whether the adjusted route represents a significant improvement over the initial route by at least comparing one or more characteristics of the initial route and the adjusted route. The method can also include in response to determining that the adjusted route represents a significant improvement over the initial route, selecting the adjusted route for presentation to a driver of the vehicle.

In some embodiments the information related to the initial route of the vehicle can include information regarding a changed preference of a customer serviced by the initial route. The information related to the initial route of the vehicle can include information regarding one or more new stops to be added to or changed for the initial route. The one or more characteristics of the initial route and the adjusted route can include one or more of the following: travel time and financial cost.

BRIEF DESCRIPTION OF THE DRAWINGS

The features of embodiments of the inventions disclosed herein are described below with reference to the drawings. Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

As mentioned above, route scheduling or route selection for a fleet of vehicles is often performed by considering shortest distance or least amount of transit time. For each vehicle in the fleet, it can be desirable to reduce the travel distance or transit time to increase the number of stops, deliveries, or the like that may be performed in a given time period.

Advantageously, this disclosure describes embodiments where the route scheduling system for a vehicle or fleet of vehicles recalculates the scheduled route based on input received after the initial route selection was already performed. The additional inputs are used for recalculation and changes in route selection, which may include a variety of inputs, such as weather conditions, traffic conditions, customer needs, vehicle inventory, and emergency situations. The recalculation of the routes can allow for route selection to be performed in real-time in order for fleets and vehicles to improve the allocation of resources.

As used herein, the terms "optimal," "optimized," and the like, in addition to having their ordinary meaning, when applied to a route can sometimes refer to a route that has a lower cost than other routes as determined by a routing algorithm. An optimal route may be the best route available (e.g., least cost), or an optimal route may simply be a route that satisfies certain routing algorithm constraints with lower cost than other available routes without necessarily being the absolute least-cost route. In addition, as used herein, the term "real time" and the like, in addition to having its ordinary meaning, can mean rapidly or within a certain expected or predefined time interval, and not necessarily immediately. For instance, real-time routing updates may be provided within a few minutes, or 5 minutes, or 10 minutes, or some other short period of time after receiving information that triggers re-calculation of a route.

II. Vehicle Management System Overview

Figure 1:
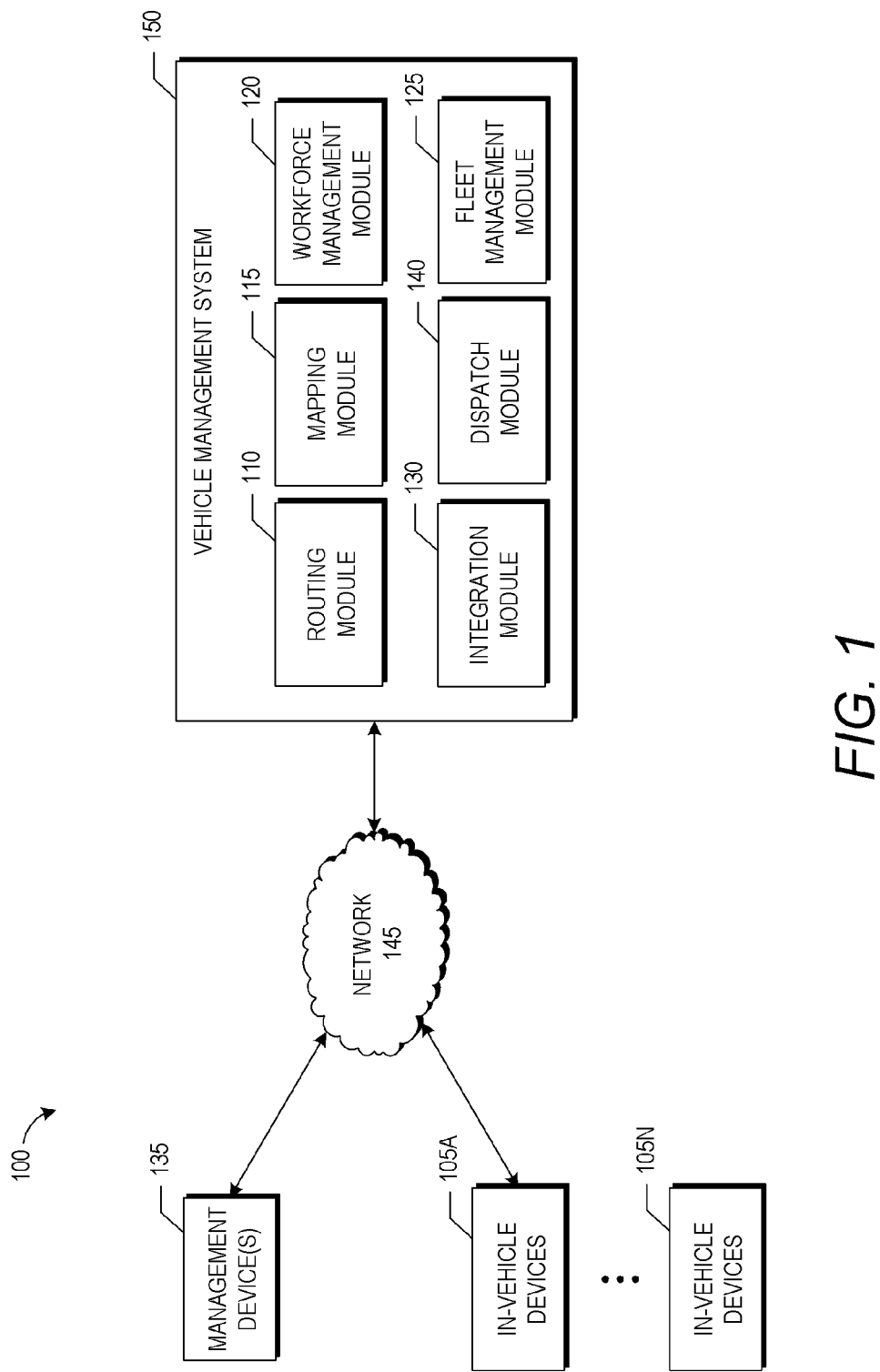
FIG. 1 illustrates an embodiment of a vehicle management system having a routing module that performs routing.

FIG. 1 illustrates an embodiment of a computing environment 100 for implementing an example vehicle management system 150. Among other features, the vehicle management system 150 can perform vehicle routing based upon time, distance, energy usage and other considerations.

In the computing environment 100, one or more in-vehicle devices 105A ... 105N and management devices 135 communicate with the vehicle management system 150 over a network 145. The in-vehicle devices 105 can include computing devices installed in fleet vehicles. These devices 105 can include navigation functionality, routing functionality, and the like. The in-vehicle devices 105 can receive route information and other information from the vehicle management system 150. In addition, the in-vehicle devices 105 can report information to the vehicle management system 150, such as driver location, speed, energy consumption, and so forth. More generally, the in-vehicle devices 105 can be any navigation device or computing device associated with a vehicle or with a driver. For example, a driver's cell phone, laptop, tablet, or other computing device can be used as an in-vehicle device, and may or may not always be kept in the vehicle.

The management devices 135 can be computing devices used by dispatchers, administrators, or other users to manage different aspects of the vehicle management system 150. For example, a user of a management device 135 can access the vehicle management system 150 to dispatch vehicles and drivers and perform other fleet management functions. With the management devices 135, users can access and monitor vehicle information obtained from the in-vehicle devices 105 by the vehicle management system 150. Such information can include data on energy usage, vehicle routes used, stops, driver behavior and performance, vehicle emissions, vehicle maintenance, and the like. In some embodiments, the management devices 135 are located at a dispatch center.

The vehicle management system 150 can be implemented by one or more physical computing devices, such as servers. These servers can be physically co-located or can be geographically separate, for example, in different data centers.

Advantageously, in the depicted embodiment, the vehicle management system 150 includes a routing module 110 that can perform real-time route management. The routing module 110 can select at least some routes for the vehicles that reduce energy use costs, improve operational efficiencies, improve customer service, and/or reduce vehicle emissions. In some embodiments the routing module 110 can automatically select an initial route that takes into account factors that affect cost, time, distance, and energy usage, such as terrain or elevation, vehicle characteristics, driver characteristics, road conditions, traffic, speed limits, stop time, turn information, traffic information, and weather information, and the like.

After the selection of the initial route, in one embodiment the routing module 110 can be used for real-time route management. During real-time route management the routing module 110 continues to analyze the factors that were used to calculate the cost, time, and energy usage. The routing module 110 can calculate alternative routes in order to take into account changes to the initial factors.

For example, given two equally feasible routes that would result in on-time deliveries for a delivery company, the routing module 110 may select the route with lowest energy cost based on one route having more level elevation than the other route. Due to the more level elevation, the chosen route can result in less energy consumption for some types of vehicles (such as gasoline vehicles).

Other modules of the vehicle management system 150 include, in the depicted embodiment, a fleet management module 125, a mapping module 115, a workforce management module 120, an integration module 130, and a dispatch module 140. The fleet management module 125 can include functionality for managing vehicles in a fleet. For example, the fleet management module 125 can allow users to schedule and monitor vehicle preventative maintenance, vehicle operating costs, and the like. The mapping module 115 can provide mapping functionality that provides worldwide mapping data, including terrain or elevation data. The mapping module 115 can be accessed by the routing module 110 to provide mapping and elevation data for different routes. The mapping module 115 may also be accessed by the in-vehicle devices 105 in some embodiments.

The workforce management module 120 can provide communication functionality with the in-vehicle devices 105 or with drivers' mobile handheld devices (not shown) to connect drivers with the vehicle management system 150. The integration module 130 can facilitate integration of the vehicle management system 150 with other systems, such as fuel card systems, payroll systems, supply chain system, insurance systems, and the like. The dispatch module 140 can provide functionality for users of the management devices 135 to assign drivers and vehicles to routes selected by the routing module 110.

The illustrated network 145 may be a LAN, a WAN, the Internet, combinations of the same, or the like. For ease of illustration, the vehicle management system 150 has been depicted as a centralized system. However, in other implementations, at least some of the functionality of the vehicle management system 150 is implemented in other devices. For instance, the in-vehicle devices 105 may implement the routing functionality described herein. Other possible implementations of the vehicle management system 150 can include many more or fewer components than those shown in FIG. 1.

III. Routing Module Embodiments

Figure 2:
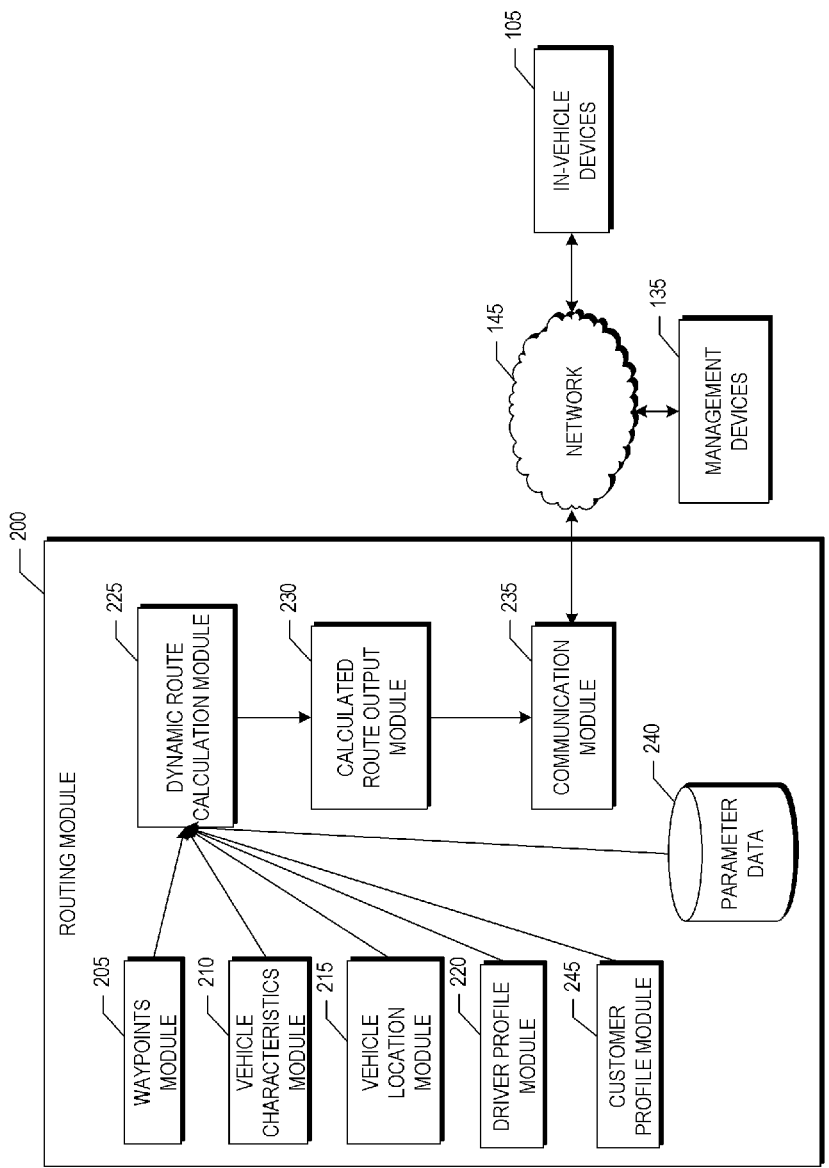
FIG. 2 illustrates an embodiment of a routing module usable with the system of FIG. 1.

Turning to FIG. 2, an embodiment of a routing module 200 is shown. The routing module 200 is a more detailed embodiment of the routing module 110 described above and includes all the features thereof. The routing module 200 can select a route that reduces or minimizes the energy use, cost, time, and/or distance traveled by a vehicle. In some embodiments, the routing module 200 can select routes for multiple vehicles that take into account a multiplicity of factors. In some embodiments, the routing module 200 can improve efficiency, for example, by rerouting vehicles that could be otherwise delayed on an initial route based on information received after a vehicle has commenced traversing the route. The management devices 135 and in-vehicle devices 105 of FIG. 1 are also shown communicating with the routing module 200 over the network 145.

In the depicted embodiment, the routing module 200 includes a waypoints module 205, a vehicle characteristics module 210, a vehicle location module 215, a driver profile module 220, a route calculation module 225, a calculated route output module 230, communication module 235, and a customer profile module 245. The routing module 200 can also include one or more parameter databases or data repositories 240 for storage of information regarding various road parameters, such as, but not limited to, speed limits, one-way vs. two-way information, traffic signal and traffic sign information (e.g., estimated wait times for different times of the day), road hazard or closure information, construction information, and traffic information (e.g., congestions, detours and accident), toll way charges, and the like. The data repository 240 can be updated periodically throughout the day. In some embodiments the data repository 240 is updated in real-time or near real-time as new data is made available. The data may be updated from different data repositories, such as the national weather service, traffic data, fuel price indexes, and the like.

The waypoints module 205 can access waypoint data useful for constructing a route. The waypoint data can include a starting location, a target or destination location, intermediate waypoint locations, landmarks, and the like. The starting and ending location as well as possibly other waypoints can be input by a user of a management device 135. At least some of the waypoints data can also be provided to the waypoints module 205 from the mapping module 115 described above.

The vehicle characteristics module 210 can store vehicle characteristics regarding vehicles in a fleet. These characteristics can be input by a user, for instance. The vehicle characteristics can include, but are not limited to, vehicle energy type based on energy consumption (e.g., gasoline-powered, electric, hybrid, or alternative fuel), vehicle class (e.g., passenger vehicle, commercial truck or trailer, bus), vehicle dimensions, vehicle weight (e.g., unloaded or loaded, estimated or actual), vehicle capacity, vehicle energy functions (e.g., energy regeneration capabilities, limitations on range), maintenance history, vehicle cargo inventory and the like.

The vehicle location module 215 can determine location information for each vehicle in the fleet. In one embodiment, this location information is multi-dimensional, such as three-dimensional. For example, the location information can include a latitude component, a longitude component, and an elevation component. The location information can be manually input by a user or can be automatically determined from Global Positioning System (GPS) functionality of the in-vehicle devices 105 or within a mobile device (e.g., a phone) carried by an operator of the vehicle. The vehicle location position module 215 can update the position information periodically (e.g., every minute, every two minutes, every 10 minutes, every hour, or at some other interval) or substantially continuously, as position and other telematics data is received from the vehicle.

The driver profile module 220 can store and/or determine driver characteristics or behavior. For example, a driver can develop a habit for aggressive driving (e.g., hard, rapid acceleration and deceleration and/or speeding) or for laziness (e.g., long idling times or break times) and the module 220 can store data about such habits. In some embodiments, the driver profile module can also include data such as age, preferred driving times, preferred days of work, wage information, overtime information, number of years of experience, and the types of vehicles the driver is trained or licensed to operate.

The customer profile module 245 can store customer information and characteristics. The customer profile characteristics can include information such as delivery times, delivery windows, customer orders, customer preferences and the like. The customer characteristics may also include a customer classification. For example, a customer database may have a hierarchical structure (e.g., tier 1, tier 2, etc.) of customers for determining customer priority. The customer classification may provide additional information that can be relevant in determining timing and cost considerations of routes. For example, a tier 1 customer may have a smaller delivery window than a tier 3 customer. Customer characteristics may be input through the in-vehicle devices or the management devices. For example, a driver may update the customer profile to reflect customer changes made to the customer's order at the time of delivery. Customer requests can be placed on a website accessible to customers, or by contacting an operator of the VMS 150.

The route calculation module 225 can determine one or more alternative feasible, or candidate, routes from a starting waypoint to a destination waypoint. The feasible routes can be determined using one or more initial searching algorithms based on one or more initial criteria, factors or variables (e.g., distance and/or estimated transit time) to trim down search space to exclude unreasonable routes. The feasible routes can be determined based on input received from the waypoints module 205, the vehicle type module 210, the vehicle location module 215, the driver profile module 220, customer profile module 245, and/or the parameter database 240. In some embodiments, the route calculation module 225 identifies a route where the vehicle will arrive at the destination waypoint in the least amount of time based upon the input received. The route calculation module, can determine additional feasible routes after the initial route has been selected. For example, after a vehicle has already commenced the initial route, the routing module 110 or 200 may receive additional information relating to a massive traffic accident that could significantly affect the travel time and cost calculations performed for the initial route by the route calculation module 225. The route calculation module 225 could use this information to calculate alternative feasible routes before the vehicle arrives at the portion of the initial route that may be affected by the accident.

Any number of search algorithms or methods can be used without departing from the spirit and/or scope of the disclosure, including but not limited to, breadth-first algorithms, depth-first algorithms, best-first algorithms, Djikstra's algorithm, the Hungarian (Munkres) algorithm, the A* algorithm, Traveling Salesman-related algorithms, linear programming algorithms, genetic algorithms and combinations or modifications of the same. Moreover, any number of data structures can be used to implement the algorithms (e.g., graphs, trees, heaps, stacks, queues, priority queues, combinations of the same, and/or the like). One example search algorithm used to generate feasible routes or optimal routes based on a cost function, which can be implemented by the routing module 200, is described in U.S. Patent Application Publication No. 2010/0153005, filed on Dec. 8, 2009, the disclosure of which is hereby incorporated by reference in its entirety.

The calculated route output module 230 can output the one or more routes identified by the dynamic route calculation module 225. The routes can be output to an in-vehicle device 105 (e.g., a vehicle-based display unit, a handheld mobile device) over the network 145 (e.g., a client computing device, a management device 135). In some embodiments, the calculated route output module 230 can output feedback to a driver (e.g., directions, instructions, warnings, alerts, alarms). For example, where an alternate route is calculated in real-time that is different from the initial route, the calculated route output module 230 may have a user interface that can show deviations of the alternative route and show how the distance, time, energy usage, and other parameters compare to the initial route. In some embodiments, the calculated route output module 230 may provide multiple alternative routes. In some embodiments, the calculated route output module 230 is in communication with, and controls operation of, a display device and/or one or more audio devices.

In some embodiments, the calculated route output module 230 generates audible instructions or signals, thereby permitting a user of an in-vehicle device 105 to follow a route to a destination. Such signals may include, for example, beeps or tones that are generated when a driver approaches a pertinent intersection, or may include verbal directions, such as "turn left ahead." In some embodiments, the verbal directions are in a language the user understands, such as English or French, and the language can be changed by the user of the system based on their personal preferences.

The communication module 235 can facilitate communication by and with the routing module 200 over the network 145. In some embodiments, the communication module 235 receives data from the network 145 and transmits data to the management device 135 and/or to the in-vehicle devices 105. The communication module 235 can provide the route calculation module 225 with access to network resources or information resources, such as traffic and weather data, over the network 145.

The parameter database 240 can include one or more storage databases or other data repositories. In addition to storing the various road parameters described above, the parameter database can store any data that may be used to determine the costs of routes or portions of routes (e.g., legs). The parameter database 240 can be in communication with the route calculation module 225 and any of the other sub-modules of the routing module 200. In some embodiments, the parameter database 240 can be communicatively coupled to the network 145. As one example, the parameter database 240 can include look-up tables of information related to average stop times for traffic lights based on statistical averages. The look-up tables can store different stop times for different times of the day for each traffic light. As another example, the parameter database 240 can store historical or real-time traffic information. As another example, the parameter database 240 can store terrain characteristics information, acceleration or deceleration data for various roadway slopes or incline angles and/or weather information. As another example, parameter database can include cost information for services or commodities, including fuel prices, courier services, air freight costs, and other available data.

In other embodiments, the parameter database(s) 240 or other data repositories can reside on the management devices 135, in the dispatch module 140, within a vehicle, or at other remote locations communicatively coupled to the network 145.

IV. Example Route Cost Considerations

The cost of a route has constraints, factors, or variables that can be used to determine overall cost using a composite cost function. The cost function can receive as inputs one or more criteria, factors, or variables. The cost function can also be constrained by one or more constraints.

For example, the cost of a route can depend on monetary factors. Such factors can include driver wage information, overtime information, estimated wear-and-tear or maintenance information (e.g., tire replacement costs, brake replacement costs), tollway costs, and the like. The money component can be a linear function of time; however, at least a portion of the money component can be non-linear (for example, when an overtime period is reached the monetary cost per unit time can deviate from a previous linear function).

In some embodiments, the time component of a cost function can be affected by, but is not limited to, the following: estimated transit time (which may include duration and/or time of day of start of travel), road closure information, road restrictions, hazardous weather information, mandatory break times, scheduling conflicts (e.g., weekends, holidays), and other travel limitations (e.g., portion of route requires travel on a ferry).

The relative importance of time, monetary components, or energy use, can differ based on the circumstances. In some situations, where time is of the essence to ensure delivery by a particular time, the time component can be most important. In some embodiments, the time can be the most important for one or more legs or portions of the route and then monetary cost or energy use can be the most important for the rest of the route. Thus, the weights assigned to the various factors of the components, or to the components overall, can be dynamic based and modifiable based on the circumstances.

In some embodiments, the cost of the routes is based solely on a single criterion or factor (e.g., distance or estimated transit time). In other embodiments, the cost of the routes is based on two or more criteria or factors (multivariate analysis). The factors used to determine the cost can be weighted based on importance, estimated or actual effect on time, distance, energy use, or other criteria. In some embodiments, the cost can include a distance component, a time component, an energy use component, and/or a monetary cost component, as described above. Each of the components can be weighted as an overall component or each of the factors within the components can be individually weighted.

The cost can vary depending on particular vehicle characteristics and/or driving behaviors of particular drivers. For example, the storage capacity of the vehicle can determine how many stops the vehicle can make before restocking. Another example, the distance component cost for an electric vehicle may be affected by the limited mileage range of electric vehicles without requiring a recharge. With reference to driving behavior, a particular driver may have a tendency toward aggressive driving that greatly reduces energy efficiency (e.g., miles per gallon) and thus increases energy use cost for the route.

Stop time or idling time of a route can greatly affect a route cost. For example, there can be one or more stop signs or stop lights along a leg of a route, each having an effect on the estimated transit time and/or energy use. For example, the stop signs and stop lights can decrease transit time due to slowing down and/or stopping in compliance with the stop signs and stop lights and can increase energy use due to the fact the vehicle must decelerate and accelerate, which results in loss of conservation of momentum. There may be a single generic cost number for all stop signs, yield signs, traffic lights, or other potential causes of delay. In some embodiments, there is a unique cost number or set of cost numbers for each particular traffic light. The cost associated with a stop sign or stop light can be a static number based on statistical averages that can be determined from a look-up table or other data storage implementation. The look-up table may have different entries for particular stop lights based on time of day.

Stop time or idling time can also refer to the time required for a service vehicle to complete a service job at a particular stop. In some embodiments, the stop time can be predetermined or static. For example, for a water delivery truck, the time to unload new water jugs for a water dispenser from a truck, carry them into a facility, and remove the empty water jugs can be determined to require a predetermined amount of time on average. However, in some embodiments, the stop time can be unknown, such as for a service vehicle that is assigned to repair appliances. In such scenarios, best-guess estimates based on historical data may have to be used for stop times.

The road parameters that can affect cost can include, for example, speed limits, road conditions, traffic information, turn information, and weather information. With respect to speed limits, routes with higher speed limits may decrease estimated transit time costs, but may increase energy use costs due to velocity-squared losses. Routes with lower speed limits may increase estimated transit time costs but may decrease energy use costs. The speed limit information may also affect a type of vehicle selected for a particular route. For example, electric or hybrid vehicles may be used for routes with lower speed limits.

With respect to turn information, it may be advantageous to reduce the amount of turns on a route in general. For example, turns generally require a vehicle to slow down, which makes it difficult to conserve momentum and results in losses due to acceleration and deceleration. In addition, it may be advantageous for safety reasons or to reduce time and/or energy costs, to reduce or minimize the amount of either right-hand turns or left-hand turns depending on the side of the road that the vehicle will be driving. For example, for drivers in the U.S., left-hand turns may be reduced to avoid potential collisions in intersections from oncoming traffic and to avoid a potential increase in the stop time due to stop lights.

In some embodiments, the costs are static, based on ideal conditions or statistical predictions. In some embodiments, the costs are dynamic. For instance, the costs for traveling between stops in a road network may vary based on time of day, may vary based on the type of vehicle being driven, may vary based on a particular driver's characteristics, or may vary based on roadway parameters or conditions. As one example of a roadway parameter that may constrain the cost, a specific road may be restricted to passenger cars only. In this example, a semi-truck would be prohibited from traveling on the segment and the cost of traveling the road would, in some embodiments, be infinite (in the graph sense).

As one example of multivariate cost determination, the cost of route R1 and R2 can be based on the factors of elevation change and distance. The distance factor can be weighted substantially lower than the elevation change factor to select energy use because the elevation change factor can substantially reduce energy use. For example, the distance factor could be weighted at 20% and the elevation change factor could be weighted at 80%. If the route R1 had a distance cost of 4 and an elevation change cost of 8, then the total cost for route R1 would be 7.2. If the route R2 had a distance cost of 8 and an elevation change cost of 2, then the total cost for route R2 would be 3.2.

As another example of multivariate cost determination, each route or leg of a route can include an energy use cost, a time cost, and a monetary cost. In some embodiments, each of the energy use cost, the time cost, and the monetary cost is assigned a weight. Depending on the weights assigned to the various cost components, a different optimal route can be identified. If minimization of energy use is determined to be most important, then the energy use cost component can be weighted as 50%, the time cost can weighted as 30% and the monetary cost can be weighted as 20%. However, if the time component is most important, then the cost components can be weighted as follows: energy use cost—20%, time cost—60% and monetary cost—20%.

In some embodiments, the weights for each of the factors can be predetermined. In some embodiments, the weights are variable or constrained in real-time based on, but not limited to, user input, stop characteristics (e.g., number of stop signs or traffic lights, statistical wait time for traffic lights), vehicle characteristics, driver characteristics, road parameters, speed limits, time of day, and/or other predetermined or real-time criteria. For example, an initial route may be calculated primarily based upon energy use. The initial route may be changed in real-time to account for traffic accident where the time is assigned the highest weighted value. Another example, the weight for idling time for an electric vehicle may be substantially lower in proportion to the weight for idling time for an internal combustion vehicle. As another example, an aggressive driver with a driver profile of a hard accelerator and low miles per gallon can affect the weight assigned to the elevation change factor or the number of stops factor.

In accordance with some embodiments, the weights can be adjusted or at least based in part, on user input. For example, a user interface display can be presented to the user. The user interface can receive user input (e.g., textual input selections from a drop-down menu, checked boxes, etc.) that can provide operator override of the routing selection methods. The user inputs can be received from any user input device (e.g., keyboard, mouse, microphone, touchscreen). As one example, a particular stop on a route may have a mandatory delivery time. Accordingly, a user can provide input that causes the routing module 200 to adjust the weights of the factors such that a route is selected that minimizes or reduces estimated transit time (e.g., the time cost component).

In some embodiments, a user can also provide input regarding the vehicle type to be used to calculate one or more routes. In some embodiments, the user interface allows for operator or driver override to provide inputs that affect a change in the route as desired and/or required. In some instances, the operator override inputs may cause the routing module 200 to ignore the weighting altogether. The input received from the user can be used in real-time to determine alternative routes, thereby providing operator or driver activated real-time routing.

V. Dynamically Adjustable Routing

Figure 3:
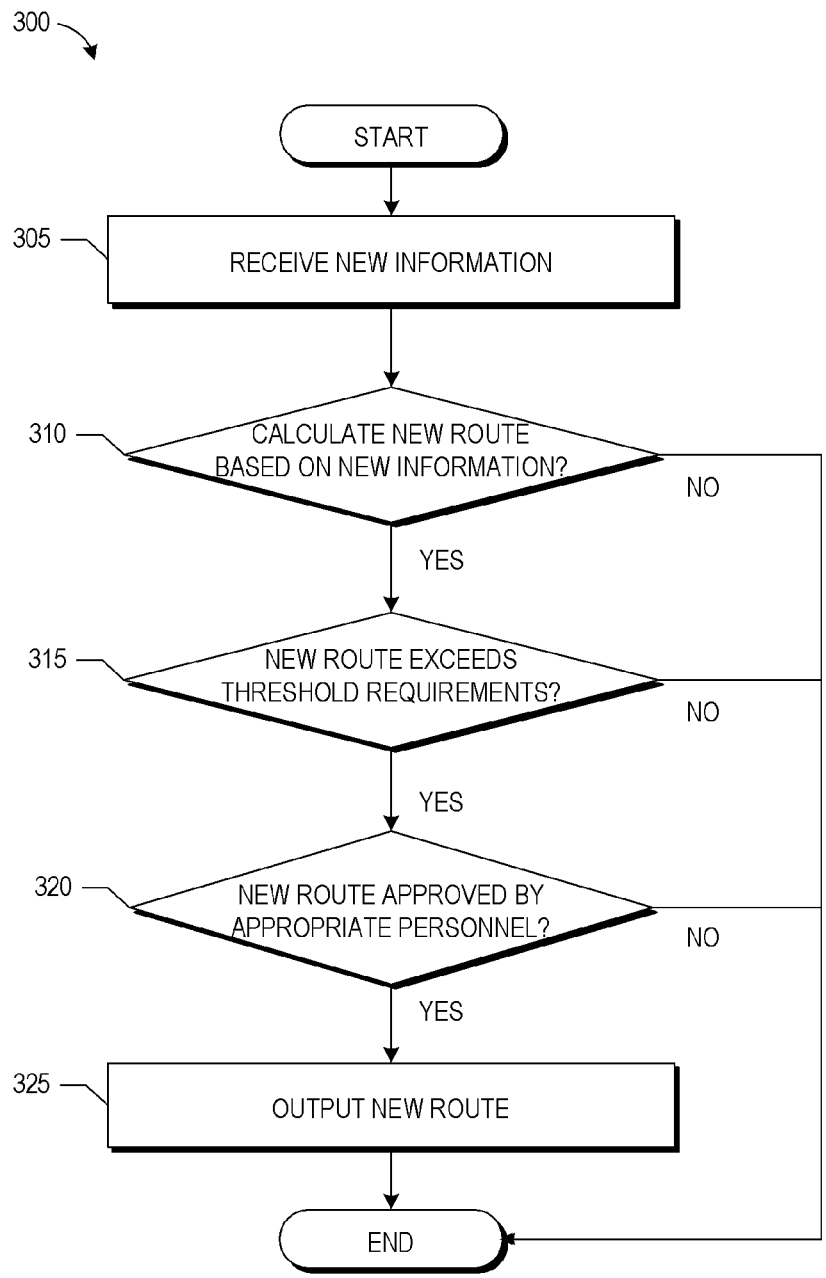
FIG. 3 is a flow diagram of an illustrative method implemented by a vehicle management system to provide updated vehicle routes in real-time.

FIG. 3 illustrates an embodiment of a dynamic re-routing process 300 executable by the routing module 110 or 200. In some instances, it may be desirable to identify a new preferred route during the course of travel. For example, delivery and enterprise company vehicles may need to receive re-routing information in real-time because an accident or other circumstance occurs on the initially planned route such that it no longer remains the optimal route.

The dynamic re-routing process 300 begins at block 305, where the routing module 200 receives new information after the initial calculation of the route. The new information can come from other modules or databases, such as the waypoints module 205, vehicle characteristics module 210, vehicle location module 220, driver profile module 220, customer profile module 245, and/or parameter data 240. The received information can include, for example, road closure information, detour information, construction information, accident information, road hazard information, hazardous weather information, driver input, and/or the like. In some instances, the information may be related to the breakdown of another vehicle within the fleet. In some instances, the received information designates a particular stop along the route as requiring mandatory delivery by a specific time.

In some embodiments, the new information is received by the vehicle location module 215 over the network 145 (e.g., from a tracking module of the dispatch center 140). The new information may be accessible via a cloud or network based system that allows the retrieval of the information by the routing module, the management devices, and/or the in-vehicle devices in real-time. The new information may be provided to the routing module 200 at specific intervals, or it may be updated in real-time as the new information becomes available. By way of example, fuel prices may be updated on a daily basis, whereas traffic conditions may be updated continuously. The new information may be received at any time after the calculation of the initial route, which may be prior to the start of the route, or after the route has already commenced. The new information may be updates to existing information. The processing of the new information may be performed in part by the management devices 135, in-vehicle devices 105, and/or the vehicle management system 150.

In scenarios where routes of multiple vehicles are being calculated, re-routing information may be generated based on the new information at a centralized dispatch center or routing center and transmitted to the vehicles over a network. The centralized dispatch center can include a display that shows where some or all of the vehicles of a fleet are currently located and traffic information, including congestion, construction, detours, accidents, etc. The centralized dispatch center may advantageously be able to determine if vehicles have sufficient fuel or battery capacity to complete the route if re-routed. In some embodiments, the vehicles can receive re-routing information (e.g., traffic information, weather information) from a third-party application accessible over a communications network and not from a centralized company routing center. The centralized dispatch center can implement the features of the vehicle management system 150 ("VMS") described above with respect to FIG. 1, including the routing module 110.

After new information is provided to the routing module 110 or 200, at decision block 310, the routing module 110 or 200 determines whether to calculate a new route based on the new information. To the extent that the new information affects the costs associated with the initial route, the information can be used to update the cost of the initial route. For example, traffic information may be received that increases the expected travel time of the initial route. The routing module 110 or 200 can update the initial route with an increased travel time and update other corresponding cost characteristics.

The routing module 110 or 200 can use the new information to assess whether to calculate a new route. Prior to calculating a new route there are various thresholds that need to be satisfied. The thresholds may include a series of be automated or computer-based thresholds, and/or user-approved thresholds. The thresholds can be implemented to filter the incoming information so that the routing module 110 or 200 is not constantly calculating new routes every time new information is received. However, in some embodiments the routing module 110 or 200 can recalculate routes every time new information is received. If the thresholds are not satisfied then the routing module 110 or 200 does not proceed to the next step and does not calculate a new route based on the information.

The automated or machine-based thresholds can include a set of conditions or rules that can be satisfied before the routing module 110 or 200 will proceed with calculating a new route. In one embodiment, the thresholds are selected by the VMS administrators. In another embodiment the thresholds can be selected by the routing module 110 or 200 programmatically. Any number of thresholds can be implemented. The thresholds may be cost-based, information based, or any other type of threshold. The cost-based thresholds may be based on time, energy usage, monetary cost, distance, and the like. The threshold may be a limit that is satisfied by exceeding and/or being equal to the specified value. For example, the route may be recalculated when the monetary cost of the initial route increases by at least a specific amount.

The thresholds may include a more complex set of rules or algorithms. The thresholds may also affect how the recalculation of the route is performed. In some embodiments, initial routes are planned with certain weights applied to energy usage, time, distance, and the like, as described herein. In one example, a fuel cost threshold may be implemented that is satisfied when the fuel price increases by a certain percent. If the fuel cost threshold is satisfied then the routing module 110 or 200 can increase the energy usage weight when calculating an alternative route. Another threshold could be implemented where if the fuel cost drops by a certain percentage, the route could be recalculated by applying a heavier weight to the time component of the initial route.

The threshold may be based on the route characteristics of the initial route. The initial route has a plurality of initial route characteristics, such as energy usage cost, time, distance, monetary costs, expected delivery times, and the like. The routing module 110 or 200 may compare new information to the initial route characteristics to determine whether a threshold has been satisfied. For example, for traffic conditions the routing module 110 or 200 can calculate the difference between the initial route travel time and updated route travel time to determine whether a threshold has been satisfied.

In some embodiments, the thresholds may be satisfied by the receipt of specific information or the notification of specific events. For example, a notification that a vehicle is broken down may automatically satisfy the threshold and trigger the routing module 110 or 200 to proceed with recalculation of routes. In another instance, a notification that a customer has cancelled a scheduled delivery may trigger the recalculation of the initial route. In some embodiments, a driver or operator of the can request that the VMS 150 calculates alternative routes to the initial route. The routing module 110 or 200 may provide a user interface or other functionality that enables a user to make changes to the weightings and information used for the calculation of alternative routes.

After the routing module 200 makes the determination to calculate a new route, at decision block 315 the route calculation module 225 processes the new information, calculates an additional feasible route, and determines whether the new route exceeds the route threshold requirements. In one embodiment, routes that satisfy the specific thresholds are sent to the appropriate personnel. The routing module 110 or 200 can calculate a new set of alternative feasible routes based on the new information and determine the cost (e.g., time cost) of each feasible route. The calculation of the new route(s) can be based on the new information as well as other characteristics of the initial route, such as scheduled deliveries, inventory, and the like. The calculation of the feasible route and cost determination can be performed as described above. The calculation of the initial route may have been performed with certain weighting factors that were done to optimize the route according to distance cost. Whereas after the initial route, new information, such as a change in a delivery time, may change the weighting values used in the routing calculations. Factors such as monetary cost, energy usage, time, distance, and customer delivery windows may be considered when calculating the new routes. Vehicle characteristics, such as vehicle class, may also be a factor in route selection. In some embodiments, the routing module 110 or 200 may calculate routes for more than one vehicle. For example, in some situations routes may need to be reallocated among more than one service vehicle. The routing module 110 or 200 can take into account the vehicle type and vehicle characteristics, such as storage capacity, to determine whether a particular vehicle is a viable substitute.

The newly calculated routes are compared to the initial route and a series of thresholds to determine whether the new route is a viable alternative. The characteristics of the initial route (e.g., time, energy usage, etc.) can be updated to reflect any new information received since the calculation of the initial route. The route threshold requirements can be established and function similar to the thresholds described above in connection with the block 310. The route threshold requirements may be the same as the route calculation threshold requirements. The route thresholds may be set according to cost, time, energy savings, schedule specific, and the like. For example, the route calculation module 225 may receive information that there is a massive accident that would delay arrival at the destination by hours following the current route and that a new route would delay arrival by only one hour. If the route threshold is satisfied, the new route can be approved automatically by the route calculation module 225. In another example, an initial route was planned with a specific delivery for a customer. After the route started, the customer cancelled the delivery. In this example, the route could be recalculated to remove the scheduled delivery.

If the route calculation module 225 determines that the alternative routes exceed the route threshold requirements, then one or more alternative routes can be sent to the appropriate personnel for approval. The routing module 110 or 200 may calculate many routes that are never sent to the appropriate personnel for approval because the route threshold requirements were not satisfied. In some circumstances, the routing module 110 or 200 may be instructed to recalculate routes based on input received from a user (e.g., driver, administrator, etc).

At decision block 320, the communication module 235 communicates the new routes based to the appropriate personnel for approval. Depending on the route change, the appropriate personnel may be the driver, the administrator, and/or other personnel. The information can be presented to the personnel in a user interface on a management device 135, an in-vehicle device 105, or other electronic device, such as a mobile phone. The VMS 150 can present a comparison between the initial route and the alternative routes in the user interface. The comparison may include the updated cost associated with the initial route, the cost of each of the alternative routes, and important route information, such as delivery times. In some embodiments the VMS 150 may present the driver or administrator with options to adjust the route, route calculation parameters, and recalculate additional routes.

Depending on the type of new information received, the new route(s) may be sent to different personnel for approval. The hierarchy of approvals can be programmed into the VMS 150. For example, a route change based on traffic that only affects the driver of a single vehicle and does not affect the delivery schedule may be approved solely by the driver of the vehicle. In some instances, the changes are sent to a central dispatch center to be approved by a fleet manager. For example, if a vehicle breakdown occurs that puts a vehicle out of service, two other vehicles in the fleet can be used to meet the delivery obligations of the vehicle that is out of service. An administrator could approve the changes in the routes so that multiple vehicles and resources could be coordinated for the change in routes. If the new route is approved by the appropriate personnel, the calculated route output module 230 can update the VMS 150 with the newly approved route. If the new route is not approved, the re-routing process ends. The process can be reinitiated if warranted by the receipt of additional information.

At block 325, the routing module 110 or 200 outputs the new route to the appropriate devices. The routing module 110 or 200 may output the new route to management devices 135, in-vehicle devices 105, mobile devices, such as smart phones, navigation devices, and the like. In some embodiments the driver(s) may receive the updates on a user-interface of an in-vehicle device 105. In some embodiments, the output of the new route to the vehicle driver may be accompanied by an electronic notification or audible sound. In some embodiments the driver may be required to acknowledge receipt of the updated route. There may be instances, however, where no notification of the update is provided.

Figure 4:
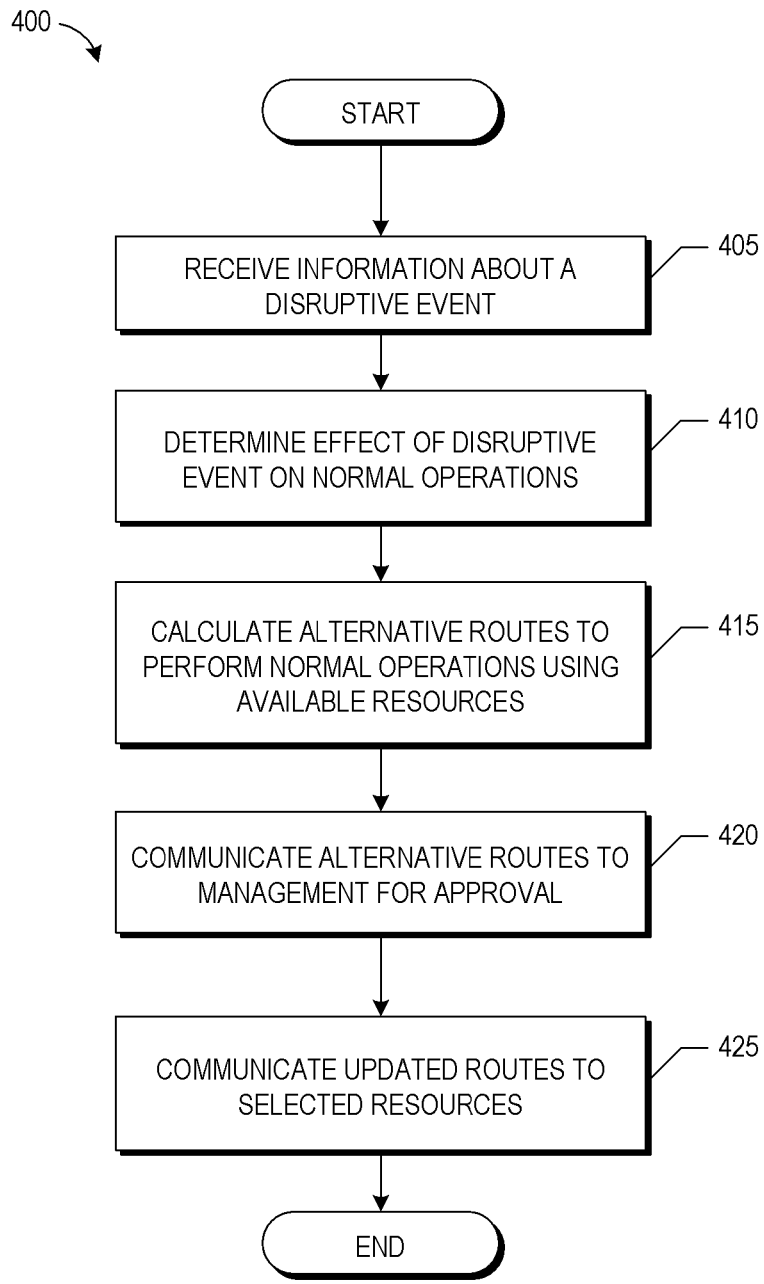
FIG. 4 is a flow diagram of an illustrative method implemented by a vehicle management system to provide dynamic fleet resource management during a disruptive event.

FIG. 4 illustrates an embodiment of a method for dynamic fleet resource management during a disruptive event 400. This method may be implemented by the vehicle management system 150 and the routing module 110 or 200 described in connection with FIGS. 1 and 2. During fleet management, there are unexpected and unscheduled events that sometimes occur that disrupt the schedules and routes of the vehicles managed by the vehicle management system 150. Generally, the fleet as a whole has a finite number of resources to perform a group of tasks or jobs. There may be repeating tasks that are performed daily, weekly, monthly, and/or yearly. Other tasks are performed on an as-needed basis. The responsible personnel, such as an administrator, manage these tasks and events to ensure that they are completed within specific constraints.

Generally, the tasks are allocated among the available vehicles according to some specific criteria, such as delivery routes, geographical responsibilities, vehicle type and the like. If one of the vehicles is unable to perform its scheduled tasks, the tasks may be delayed until the vehicle is back in service or the tasks must be divided between the remainder of the available vehicles. When there is planned downtime of a vehicle, such as scheduled maintenance, the administrator can plan accordingly. However, many times a vehicle may go down unexpectedly and disrupt the planned tasks that the vehicle was scheduled to perform. For example, a beverage delivery truck may get into an accident and is unable to perform the remainder of its deliveries for the day. In another example, a blizzard, hurricane, or other severe weather condition may render several vehicles inoperable or make stops difficult or impossible to perform. When a disruptive event occurs, notification of the disruptive event can be communicated to the vehicle management system 150 so that a solution can be implemented.

With reference to block 405, the vehicle management system 150 receives information about a disruptive event. The information may also be provided to the VMS 150 through management devices 135 or the in-vehicle systems 105. In some embodiments, the information is sent to the vehicle management system 150 automatically via in-vehicle devices or other automated software or hardware that senses a disruptive event and sends it to the vehicle management system 150. For example, a vehicle computer can detect engine failure and report it to the VMS 150 via GPS or over a network through the in-vehicle device 105.

After the disruptive event notification is received by the vehicle management system 150, at block 410, the vehicle management system 150 determines the effect of the disruptive event on normal operations. The vehicle management system 150 identifies or receives information regarding the characteristics of the disruptive event, such as the expected length of time of the event and the number of tasks that are impacted. In some situations, the disruptive event may result in only a temporary suspension of activity for the resource, such as a flat tire or traffic jam, or it may be a more long-lasting event, such as an accident rendering the vehicle inoperable. The VMS 150 can use the expected duration and/or of the disruptive event to calculate what events or tasks are impacted by the inability of the resource to perform the scheduled tasks. For example a delivery truck that gets in a severe accident may be unable to perform any outstanding tasks. In this instance, the VMS 150 can identify each delivery and any other tasks that the delivery truck was scheduled to complete.

After the effect of the disruptive event is determined, at block 415, the VMS 150 calculates feasible alternative routes using available resources or vehicles to perform scheduled operations. The calculation of alternative routes can be performed by the routing module 110 or 200 as described above. The routing module 110 or 200 identifies vehicles that would be capable of performing the scheduled tasks. The vehicles may be evaluated according to a number of factors, such as vehicle characteristics, driver information, geographical locations, work load, and the like. The vehicle characteristics may include information such as vehicle type, storage capacity, vehicle hardware, vehicle inventory, available fuel, and other factors that can be used to assess the suitability of the resource to perform the tasks affected by the disruptive event. The driver information may include information such as driver profiles, availability, pay, overtime cost, and other driver characteristics. Geographical location and work load may be used to determine the viability and costs associated with using the resource to perform the impacted tasks.

From this information the routing calculation module 225 identifies available resources that may be suitable to perform the impacted tasks. For example, if a beverage delivery truck is inoperable, the suitable replacements may be limited to other beverage delivery trucks within the fleet. The VMS 150 can determine feasible alternative routes for one or more vehicles in order to perform the impacted tasks. In addition to the availability of the vehicles, the constraints and weighting of the algorithms may be changed to account for additional factors, which can include delivery times, delivery windows, customer classifications, task importance and the like. The route calculation module 225 can create one or more routes involving at least one vehicle to perform the impacted tasks. The tasks that are being scheduled may have different weightings based on the importance of the task, priority and classification of the customer, deadline for completion of the task, and the like. For example, some tasks that are initially impacted by the disruptive event may be able to be rescheduled for a time after the disruptive event has been resolved. The route calculation module 225 may calculate routes that do not include every impacted task in the originally scheduled time period. For example, a scheduled maintenance task may not be scheduled into the alternative route because it can be scheduled the following day with minimal impact. Had the task been incorporated into the alternative schedule, the task may have resulted in a significant increase in cost.

The routing module 110 or 200 may take into account energy usage, time, cost, distance, and/or other factors in calculating the new routes. The route calculation module 225 calculates the cost associated with each new route. The route calculation module 225 can calculate routes where the impacted vehicle performs a portion of the tasks it was originally scheduled to perform and at least one other vehicle performs other impacted tasks.

The routing module 110 or 200 outputs the new alternative route(s), at block 420, and communicates them through the communication module 235 to the appropriate personnel for approval. These routes can be sent to an administrator or other management personnel at a centralized dispatch center to approve the updated routes for some or all of the impacted vehicles. Further, the vehicle management may provide multiple options and the costs associated with the different options. The routing module 110 or 200 can present the administrator, the driver, or other appropriate personnel with a choice between two different sets of routes. For example, a first set of routes uses a single vehicle to perform the impacted tasks and a second set of routes uses two vehicles to perform the impacted tasks. The information may include the estimated extent of the disruptive event, the impacted vehicles, the impacted tasks, the alternative routes, and the costs associated with each route.

In some embodiments, after the routing module 110 or 200 determines what tasks may be impacted by the disruptive event, an administrator or other personnel can determine what impacted tasks to include in the new route. An administrator can instruct the routing module 110 or 200 to calculate a new route with less than the total number of impacted tasks. For example, an administrator may determine that only half of the impacted tasks are to be completed in the new route. The routing module 110 or 200 can then calculate new routes that reflect the administrator's selection of impacted tasks.

The vehicle management system 150 may continue to receive information regarding the progress and position of the available vehicles so that the newly calculated routes take into account the actual position of the available vehicles. The alternative routes can be calculated with a buffer of time that gives the administrator with sufficient time to make the appropriate decisions such that the route does not need to be updated constantly to account for the small increments of time.

After the new routes are approved, at block 425, the updated routes are communicated to the selected resources. The routing module 110 or 200 can communicate the updated routes to the in-vehicle devices 105. In some embodiments the driver(s) may receive the updates on a user-interface of an in-vehicle device 105. In some embodiments, the operators of the impacted vehicles can receive the update and confirm that the new routes are being followed. In some embodiments the new route could replace the previous routes being followed by the impacted vehicles. In some embodiments, a portion of the routes are replaced by the new route.

Figure 5:
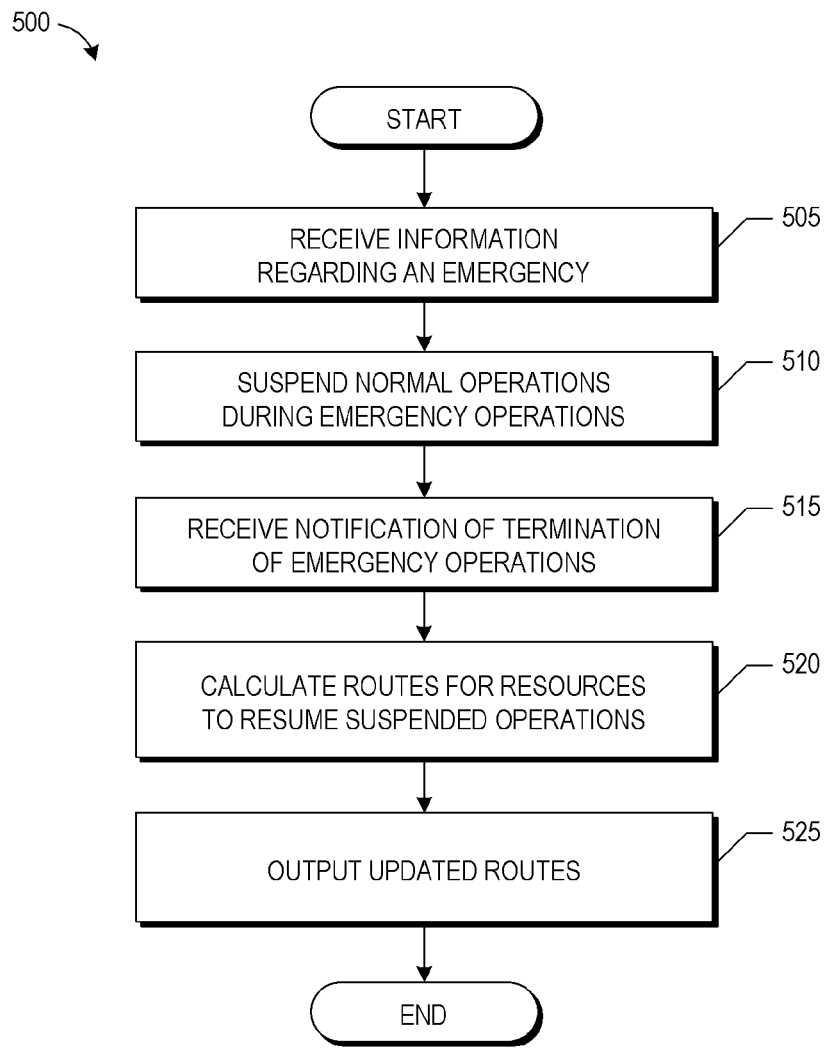
FIG. 5 is a flow diagram of an illustrative method implemented by a vehicle management system to provide emergency fleet resource management.

FIG. 5 illustrates an embodiment of a method of emergency resource management 500. The method for emergency resource management is implemented using a vehicle management system 150. The calculation of routes can be implemented using the routing module 110 or 200. Emergency fleet resource management can be used to manage vehicles that perform normal operations and perform emergency services on an as-needed basis. For example, a power company may need to respond to an emergency blackout with vehicles that may be otherwise engaged performing maintenance or other scheduled operations.

At block 505, the vehicle management system 150 receives a notification of the emergency. The notification of the emergency can communicate additional information about the emergency that may be beneficial to the VMS 150 in management and scheduling vehicles during the emergency. For example, the VMS 150 may receive the geographical location of the emergency, the geographical area affected by the emergency, the escalation level of the emergency, health or safety alerts, and other information that can be beneficial to the VMS 150 in managing the emergency. The VMS 150 may receive the additional information automatically, or the additional information may be received by users of the VMS 150, management devices 135, and/or in-vehicle devices 105. Based at least in part on the information received, the VMS 150 identifies the resources that can be utilized during emergency operations.

At block 510, the VMS 150 suspends normal operations for vehicles that are being utilized during emergency operations. During the emergency, workers and vehicles can be pulled off of regularly scheduled operations to handle the emergency. For example, a maintenance vehicle may have regularly scheduled operations that are performed on daily, weekly, and monthly bases. Depending on the nature and extent of the emergency and the number of vehicles being utilized during the emergency may vary. In some instances, all vehicles can be used to attend to the emergency. In other instances a portion of the available vehicles can continue to perform normal operations during the emergency. Due to the nature of the emergencies, the VMS 150 may not be able to schedule a specific time for which impacted vehicles will be utilized during emergency operations. In some embodiments the VMS 150 may be able to estimate the amount of time that the emergency will last based on part historical data about similar emergencies. As such the VMS 150 can monitor suspended operations on a rolling basis as they are scheduled to occur. The tasks may be categorized and accounted for by vehicle, task, priority, or other specific tracking basis that allows the suspended tasks to be organized and accounted for.

Vehicles utilized during the emergency may be released back into service at different times. After a vehicle is released back into normal operation, at block 515, the VMS 150 receives notification of the termination of emergency operations for the released vehicle. As each vehicle is released back into normal operation the VMS 150 may utilize an escalation plan or other operational plan to reintroduce the vehicles back into service. An operational plan can provide guidelines and rules for determining the priorities of returning vehicles to suspended operations. At block 520, the routing module 110 or 200, calculates routes for the vehicle to resume suspended operations. In some instances the vehicle may return to its original route and continue the previously suspended activities. In other instances a route may be calculated that includes prioritized operations that may be completed prior to the vehicle returning to its original route. In some embodiments an administrator oversees the approval of operations and route plans calculated by the routing module 110 or 200 prior to the vehicles returning to operation. In some embodiments, the routing module 110 or 200 automatically calculates new routes for each of the released vehicles. At block 525, the routing module 110 or 200 outputs new routes to the vehicles.

Figure 6:
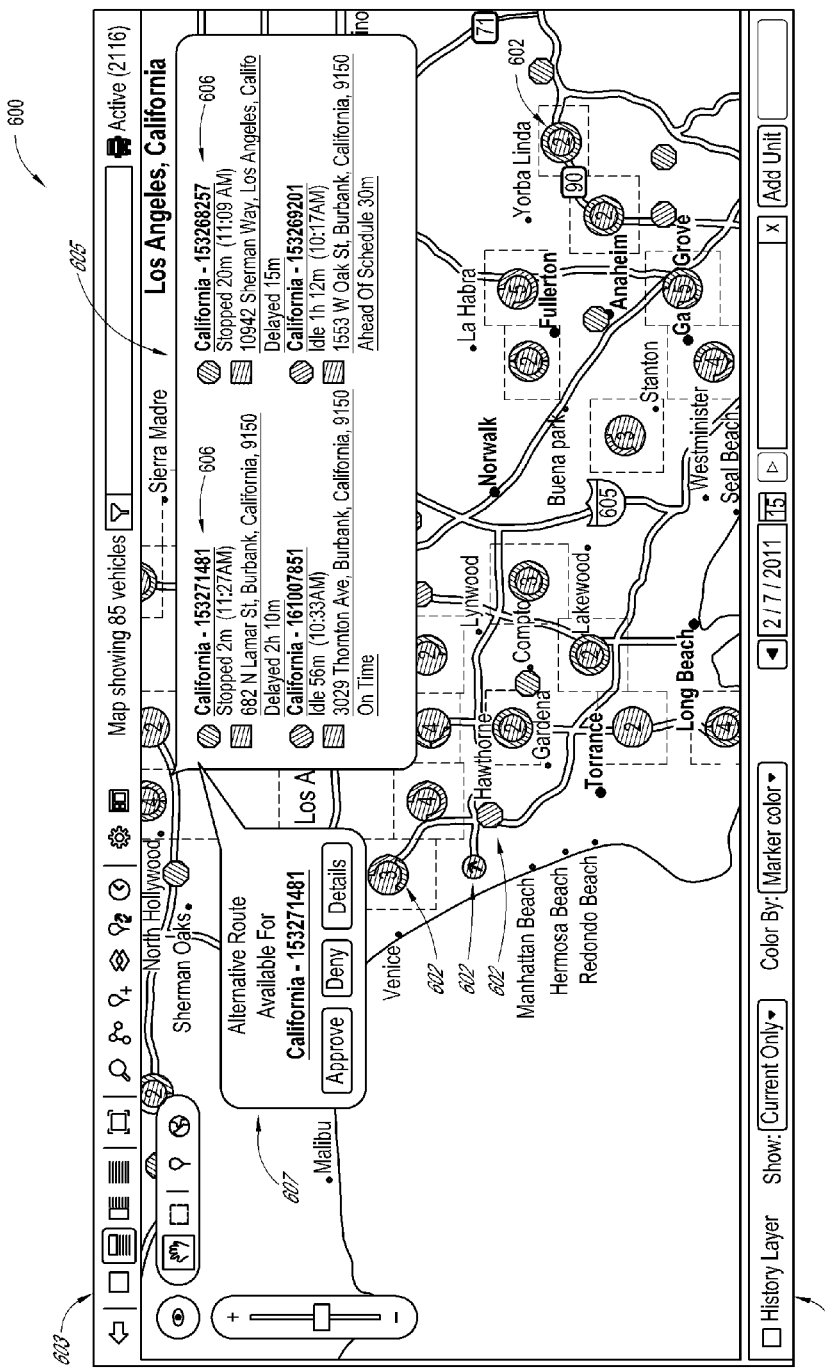
FIG. 6 illustrates an embodiment of a vehicle management system user interface.

FIG. 6 is an example of a vehicle management user interface 600. The vehicle management user interface 600 includes a map 601 having various symbols 302 that represent vehicles. Toolbars 603, 604 are included as examples of user interface controls that can be used to manage the user interface. A popup box 605 displaying certain vehicle status information is shown. The example vehicle status information shown in the popup box 605 includes vehicle information 606, such as vehicle identifiers, addresses of current locations, and information relating to the current status of the vehicles (i.e., moving, stopped, idle), and information relating to the vehicles schedule (i.e., on time, delayed, etc.).

The vehicle management system can be configured to automatically display alternative routes for one or more vehicles on the user interface 600 (or a similar user interface) after a series of computer-based thresholds have been met relating to the creation of alternative routes, as further discussed herein. In the depicted embodiment, a popup box 607 generated by the vehicle management system 150 displays an indication that an alternative route has been calculated. The popup box 607 can inform a user that one or more alternative routes are available for one or more vehicles in the fleet. The popup box 607 has a plurality of buttons that provide the user options relating to the alternative route. These buttons allow the user to approve, deny, or request additional details relating to the alternative route. Other user interface controls for performing these functions may be provided in other embodiments. In addition, notification of the available alternative route may be made using features other than a popup box.

VI. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method for dynamically updating a vehicle route, using a system comprising a vehicle management system (VMS) comprising digital logic circuitry, a memory storing executable instructions, a communication module, a vehicle in a fleet of vehicles comprising an in-vehicle device with a vehicle computer, a sensing device, a Global Positioning System (GPS) and a display, the digital logic circuitry programmed with the executable instructions that configure the digital logic circuity to perform the method comprising:
   identifying a first vehicle from a fleet of vehicles;
   calculating a first route having a first route constraint based at least partly on a first set of data, wherein the first route constraint is based, at least in part, on routing algorithm constraints associated with operation of the first vehicle on the first route, wherein the routing algorithm constraints comprise vehicle maintenance, time of day, break time, transit time, road closure/restrictions, and hazardous weather, wherein a weight indicative of importance is assigned in real-time to one or more of the routing algorithm constraints;
   providing over a network, to an in-vehicle device of the first vehicle, an electronic representation of the first route, the electronic representation presented using a display device and/or audio device of the first vehicle to a driver of the first vehicle;
   receiving over the network, information of a disruptive event captured by a sensing device in the first vehicle configured to sense the disruptive event subsequent to receiving an indication that the first vehicle is traversing a portion of the first route, wherein the indication is based, at least in part, on Global Positioning System (GPS) data associated with a real-time position of the first vehicle;
   determining whether the disruptive event prevents the first vehicle from performing a scheduled task;
   based on the determination that the first vehicle is prevented from performing the scheduled task,
   calculating plural sets of feasible alternative routes in real-time to perform the scheduled task using available vehicles in the fleet of vehicles taking into account characteristics and actual positions of the available vehicles;
   selecting a first set of alternative routes from the plural sets of feasible alternative routes that satisfy a series of computer-based thresholds, the series of computer-based thresholds is programmatically selected based on information comprising energy use, distance, schedule specific constraint, battery capacity, amount of fuel, customer needs, and vehicle location that are updated at intervals in real-time over the network from the available vehicles in the fleet of vehicles, wherein the first set of alternative routes provides an optimal set of alternative routes to perform the scheduled task by at least one of the available vehicles; and
   based on the selecting of the first set of alternative routes associated with the at least one of the available vehicles that satisfies the series of computer-based thresholds and reception of an indication of an approval of the first set of alternative routes, replacing at least a portion of the first route with a portion of the first set of alternative routes and outputting an electronic representation of the first set of alternative routes for presentation to a driver of the at least one of the available vehicles.

2. The method of claim 1 further comprising requesting administrator approval for replacing at least a portion of the first route with the portion of the first set of alternative routes in response to the selection of the first set of alternative routes.

3. The method of claim 1, wherein the plural sets of alternative routes are calculated based on one or more of the following: a time component, a distance component, and an energy usage component.

4. The method of claim 1, wherein the first set of alternative routes is configured for two of the available vehicles.

5. The method of claim 4 further comprising transmitting the first set of alternative routes to all of the available vehicles in the fleet in response to determining that the first vehicle can no longer service the first route.

6. The method of claim 1, wherein the approval of the first set of alternative routes by personnel comprises approval by a fleet manager.

7. A system for dynamically updating vehicle routes, the system comprising:

a vehicle in a fleet of vehicles comprising an in-vehicle device, digital logic circuitry, a memory storing executable instructions, a Global Positioning System (GPS), a sensing device, a display device and an audio device;

a data repository configured to store data used to calculate vehicle routes;

a vehicle management system comprising computer hardware, and a communication module configured to transmit and receive data over a network, the vehicle management system configured to at least:

calculate an initial vehicle route having a plurality of route characteristics based on the data stored in the data repository, wherein at least one route characteristic is a constraint associated with operation of a vehicle on the initial vehicle route;

provide data representing the initial vehicle route to a navigation device associated with the vehicle or a driver;

subsequent to receiving an indication that the vehicle or the driver is traversing a portion of the initial vehicle route, receive information of a disruptive event captured by the sensing device in the vehicle affecting the initial vehicle route, wherein the indication is based, at least in part, on Global Positioning System (GPS) data associated with a real-time position of the vehicle;

determine whether the disruptive event prevents the vehicle from performing a scheduled task;

based on the determination that the vehicle is prevented from performing the scheduled task, calculate plural sets of feasible alternative routes to perform the scheduled task using available vehicles in the fleet of vehicles taking into account characteristics and actual positions of the available vehicles;

select a first set of alternative routes from the plural sets of feasible alternative routes that satisfy a series of thresholds associated with energy use, distance, schedule specific constraint, battery capacity, amount of fuel, customer needs, and vehicle location, wherein the first set of alternative routes is an optimal set of alternative routes to perform the scheduled task by at least one of the available vehicles;

based on the selection of the first set of alternative routes associated with the at least one of the available vehicles that satisfies the series of thresholds and reception of an indication of an approval of the first set of alternative routes, replace at least a portion of the initial vehicle route with at least one portion of the first set of alternative routes; and transmit over the network to an in-vehicle device in the at least one of the available vehicles, an electronic representation of the first set of the alternative routes, the electronic representation presented using the display device and/or audio device of the at least one of the available vehicles.

8. The system of claim 7, wherein the vehicle management system is further configured to request approval for the first set of alternative routes prior to transmitting, over the network to the in-vehicle device of the at least one of the available vehicles, the electronic representation of the first set of alternative routes.

9. The system of claim 7, wherein the vehicle management system is further configured to calculate the initial vehicle route for the vehicle and to calculate the first set of alternative routes for the at least one of the available vehicles, wherein the vehicle and the at least one of the available vehicles are different types of vehicles.

10. The system of claim 7, wherein a navigation device in the in-vehicle device comprises Global Positioning System (GPS) functionality.

11. Non-transitory physical computer storage comprising instructions stored thereon that, when executed in one or more processors, cause the one or more processors to implement operations for dynamically updating vehicle routes, the operations comprising:

identifying a vehicle in a fleet of vehicles;

calculating an initial route having a first constraint, wherein the first constraint is based, at least in part, on at least one constraint associated with operation of the vehicle on the initial route;

providing data representing the initial route to a navigation device associated with the vehicle;

receiving information of a disruptive event that impacts the initial route subsequent to receiving an indication that the vehicle is traveling a portion of the initial route, wherein the indication is based, at least in part, on Global Positioning System (GPS) data associated with a real-time position of the vehicle;

determining whether the disruptive event prevents the vehicle from performing a scheduled task;

based on the determination that the vehicle is prevented from performing the scheduled task, calculating plural sets of feasible alternative routes to perform the scheduled task using available vehicles in the fleet of vehicles taking into account characteristics and real-time positions of the available vehicles;

selecting a first set of alternative routes from the plural sets of feasible alternative routes that satisfy a series of thresholds associated with energy use, distance, schedule specific constraint, battery capacity, amount of fuel, customer needs, vehicle location and traffic, wherein the first set of alternative routes provides an optimal set of alternative routes to perform the schedules task by at least one of the available vehicles;

based on the selecting of the first set of alternative routes associated with the at least one of the available vehicles that satisfies the series of thresholds and reception of an indication of an approval of the first set of alternative routes, transmitting data representing the first set of alternative routes to a navigation device of the at least one of the available vehicles.

12. The non-transitory physical computer storage of claim 11, wherein the operations further comprise replacing the initial route with the first set of alternative routes.

13. The non-transitory physical computer storage of claim 11, wherein the operations further comprise requesting approval for the first set of alternative routes prior to transmitting data representing the first set of alternative routes to the navigation device of the at least one of the available vehicles.

14. The non-transitory physical computer storage of claim 11, wherein the operations further comprise calculating the initial route for the vehicle and calculating the first set of alternative routes for the at least one of the available vehicles, wherein the vehicle and the at least one of the available vehicles are different types of vehicles.

15. The non-transitory physical computer storage of claim 11, wherein the information of the disruptive event comprises information related to one or more of the following: weather conditions, traffic conditions, customer needs, vehicle inventory, and an emergency situation.

16. A method for dynamically updating vehicle routes, the method comprising:
- receiving information related to an initial route of a vehicle in a fleet of vehicles subsequent to receiving an indication that the vehicle traveling is a portion of the initial route, wherein the information related to the initial route comprises at least one constraint characteristic associated with operation of the vehicle on the initial route, wherein the indication is based, at least in part, on Global Positioning System (GPS) data associated with a real-time position of the vehicle;
- receiving information related to a disruptive event,
- determining whether the disruptive event prevents the vehicle from performing a scheduled task;
- based on the determination that the vehicle is prevented from performing the scheduled task, calculating plural sets of feasible alternative routes to perform the scheduled task using available vehicles in the fleet of vehicles taking into account characteristics and actual positions of the available vehicles;
- selecting a first set of alternative routes from the plural sets of feasible alternative routes that satisfies a series of thresholds associated with energy use, distance, schedule specific constraint, battery capacity, amount of fuel, customer needs, and vehicle location, wherein the first set of alternative routes provides an optimal set of alternative routes to perform the scheduled task using at least one of the available vehicles; and
- based on the selecting of the first set of alternative routes associated with the at least one of the available vehicles that satisfies the series of thresholds and reception of an indication of an approval of the first set of alternative routes, transmitting the first set of alternative routes for presentation to a driver of the at least one of the available vehicles.

17. The method of claim 16, wherein the information related to the initial route of the vehicle comprises information regarding a changed preference of a user associated with the initial route.

18. The method of claim 16, wherein the information related to the initial route of the vehicle comprises information regarding one or more new stops to be added to or changed for the initial route.

19. The method of claim 16, wherein the one or more characteristics of the initial route and the first set of alternative routes comprise one or more of the following: travel time and energy use.

* * * * *